(12) United States Patent
Shahabuddin et al.

(10) Patent No.: US 6,877,035 B2
(45) Date of Patent: Apr. 5, 2005

(54) SYSTEM FOR OPTIMAL RESOURCE ALLOCATION AND PLANNING FOR HOSTING COMPUTING SERVICES

(75) Inventors: Johara Shireen Shahabuddin, New Delhi (IN); Kannan Balaji, New Delhi (IN); Sanjiv Kapoor, New Delhi (IN); Sandeep Juneja, New Delhi (IN); Vishu Gupta, Delhi (IN); Abhay Chrungoo, Jammu & Kashmir (IN)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/772,246

(22) Filed: Jan. 29, 2001

(65) Prior Publication Data

US 2002/0143945 A1 Oct. 3, 2002

(51) Int. Cl.[7] ............................................. G06F 15/173
(52) U.S. Cl. ..................................................... 709/226
(58) Field of Search ................................. 709/226–227, 709/213, 217–219, 238–239; 718/100

(56) References Cited

U.S. PATENT DOCUMENTS

| | | | |
|---|---|---|---|
| 5,553,239 A | | 9/1996 | Heath et al. |
| 5,734,828 A | | 3/1998 | Pendse et al. |
| 6,516,350 B1 | * | 2/2003 | Lumelsky et al. ........... 709/226 |
| 6,721,270 B1 | * | 4/2004 | Mitra et al. .................. 370/230 |
| 2001/0039581 A1 | * | 11/2001 | Deng et al. .................. 709/226 |
| 2002/0141342 A1 | * | 10/2002 | Furman et al. ............. 370/235 |

FOREIGN PATENT DOCUMENTS

| | | | | |
|---|---|---|---|---|
| EP | 748061 A2 | * | 12/1996 | ........... H04B/7/185 |

OTHER PUBLICATIONS

Huh, E., et al., "Heterogeneous Resource Management for Dynamic Real–Time Systems", Proc. 9th Heterogeneous Computing Workshop, May 1, 2000, pp. 287–296.*
Kleinberg, J. et al., "Allocating Bandwidth for Bursty Connections", Proc. 29th ACM Symposium on Theory of Computing, 1997, pp. 664–673.*
Chekuri, C. et al., "On Multi–dimensional Packing Problems", Proc. 10th ACM–SIAM Symposium on Discrete Algorithms, 1999, pp. 185–194.*
"Dynamic Load Balancing on Web Server Systems", V. Cardellini, M. Colajanni and Philip S. Yu, vol. 3, No. 3, IEEE Internet Computing, May–Jun. 1999, pp. 28–39.
"Achieving Load Balancing and Efficient Memory Usage in A Web Hosting Service Cluster", Ludmila Cherkasova and Shankar Ponnekanti, Technical Report, Hewlett Packard Labs, Feb. 2000, pp. 1–23.

(Continued)

Primary Examiner—Frantz B. Jean
(74) Attorney, Agent, or Firm—McGinn & Gibb, PLLC; T. Rao Coca, Esq.

(57) ABSTRACT

A method, apparatus, computer program product, and decision support system and for allocating hosting-service resources to clients in at least one shared server. The method comprises discovering utilization patterns of the clients; monitoring the clients to discover the utilization patterns; providing bounds specifying minimum and maximum hosting-service resources for each of the clients; modeling dimensions for client user measures and the utilization patterns; and allocating the resources to the clients dependent on the utilization patterns. The step of allocating is also dependent upon the bounds. The method further includes packing the clients using stochastic vectors, wherein the packing step utilizes at least one of a Roof Avoidance process, a Minimized Variance process, a Maximized Minima process, and a Largest Combination process, and wherein the hosting-service resources relate to at least one hosting comprising one of collaborative hosting services, commerce hosting services, and e-business hosting services.

51 Claims, 4 Drawing Sheets

OTHER PUBLICATIONS

"On the Self–Similar Nature of Ethernet Traffic (Extended Version)", Will E. Leland, Murad S. Taqqu, Walter Willinger, and Daniel V. Wilson, IEEE/ACM Trans. Networking 2, 1, Feb. 1994, pp. 1–15.

"A Closer Look at Service Level Agreement Metrics", Chris Nicoll, International Journal of Network Management, 1999, pp. 287–290.

"Wide Area Traffic: The Failure of Poisson Modeling", Vern Paxson and Sally Floyd, IEEE/ACM Trans. Networking 3, 3, Jun. 1995, pp. 226–244.

Netscape Hosting Services White Paper, 2000, http://wp.netscape.com/hosting/v4.0/whitepaper/.

"Building a Scalable and Profitable Application Hosting Business", A White Paper, Ensim Corporation, 2000, pp. 1–13.

"IBM Framework for e–business: Application hosting services", Stewart Nickolas, IBM, Oct. 1, 1999, 10 pages.

"Hosting with Exchange 2000 Server", White Paper, http://www.microsoft.com/exchange/techinfo/ASPplanning.htm, pp. 1–49.

"Application Region Manager, Creating an Agile Computing Infastructure Through Application Region Management", Sequent Computer Systems, Inc., Beaverton, Oregon, 1998, pp. 1–8.

"Self–Similarity on World Wide Web Traffic: Evidence and Possible Causes", M. Crovella and A. Bestavros, IEEE/ACM Transactions on Networking, vol. 5, No. 6, Dec. 1997, pp. 835–846.

"Allocating Bandwidth for Bursty Connections", Jon Lkeinberg, Yuval Rabini, and Eva Tardos, Proc. 29th ACM Symposium on Theory of Computing, 1997, pp. 664–673.

"Approximation Algorithms for Bin Packing–A Survey", in "Approximation Algorithms for NP–Hard Problems", E.G. Coffmna, Jr., M.R. Garey, and D.S. Johnson, Dorit S. Hochbaum, ed., PWS Publishing Company, Boston, 1995, pp. 45–86.

"Managing and Pricing Service Level Agreements for Differentiated Services", Costas Courcoubetis and Vasilios A. Siris, 6th IEEE/IFIP Conference on Quality of Service, London, UK, May–Jun. 1999, pp. 165–173.

* cited by examiner

SYSTEM FOR OPTIMAL RESOURCE ALLOCATION AND PLANNING FOR HOSTING COMPUTING SERVICES

FIELD OF INVENTION

The invention relates generally to hosting services in a networked environment and in particular to the planning and allocation of resources in such networked environments.

BACKGROUND

Companies that go online require (i) a multitude of application services and (ii) high end servers to run these applications. Examples of relevant application services include Hyper Text Transfer Protocol (HTTP), Domain Name System (DNS), File Transfer Protocol (FTP), proxy, firewalls and business applications. To achieve this, such companies face considerable overheads in installing and updating the applications and maintaining the servers. This drives the emergence of a new business model, namely, hosting applications over the web.

The demand for this business model is growing at a rapid pace, because of significant opportunities in hosting e-commerce and e-business applications for Small and Medium Businesses (SMBs). SMB managers often seek to outsource application hosting to service providers to avoid the capital expenses incurred by computing resources, software and maintenance. In this respect, the role of service providers is significant.

Hosting services cover a wide range of capabilities in three broad categories:

(i) Collaborative hosting services include email, internal and external webhosting, collaborative applications and scheduling applications;

(ii) Commerce hosting services include business applications that enable online Business to Business (B2B) trading and Business to Consumer (B2C) e-commerce hosting; and (iii) Other e-business hosting services include custom-built and Enterprise Resource Planning applications.

Examples of such hosting services can be found at the following URLS: Netscape Hosting Services White Paper, at
http://home.netscape.com/hosting/v4.0/whitepaper/; "Building a Scalable and Profitable Application Hosting Business", White Paper, Ensim Corporation, at
http://www.ensim.com/Products/index.htm; IBM: developerWorks: Web architecture library, "IBM Application Framework for e-business: Application hosting services", Stewart Nickolas, IBM, October 1999, at
http://www-4.ibm.com/software/developer/library/ahs/; and "Hosting with Exchange 2000 Server", White Paper, at http://www.microsoft.com/exchange/techinfo/ASP planning.htm.

These hosting services are especially relevant for SMBs, which can access highly functional applications without having to incur a large capital expenditure while maintaining the focus on core competencies. In the absence of such hosting services, the SMB segment has to afford dedicated services and knowledge about the resource requirements such as a central processing unit (CPU), Random Access Memory (RAM) and business applications for running their e-businesses, which can clearly not be a cost-effective solution.

From the service provider's perspective, hosting quality services for the SMB necessitates providing flexible, cost-effective services within a Quality of Service (QoS) guarantee. Planning and optimizing the resource requirements for hosting such services, based on the requirements of its clients, is an important objective for a service provider.

Different approaches for hosting services are described briefly at the following URL: Building a Scalable and Profitable Application Hosting Business", White Paper, Ensim Corporation, at http://www.ensim.com/Products/index.htm. These different approaches are described briefly hereinafter.

Dedicated Services

The dedicated services model dictates that a client be given an integral number of servers by reserving these exclusively for the client. However, the use of this approach in a SMB context, where a shared server may suffice, may be too expensive. Also in a large enterprise context, using this approach may be prohibitive, since huge reservations may be needed to ensure service during limited peak hours.

Shared Services

The shared services model is a popular method used by service providers, especially for virtual web hosting and applications designed specifically to support multiple customers on a single instance of an application. In this approach, multiple customers and services are hosted on a single server. However, in a shared environment, QoS is difficult to guarantee to clients. A surge in traffic of one client may adversely affect a co-located client. Reliability and security are other issues, which are difficult to address in this approach.

Virtual Servers

The concept of virtual servers is relatively new, but appears to be on the verge of becoming mainstream. Virtual Server technology involves creating multiple logical servers on a single system, enabling individual users to have equal access to computer resources, such as RAM and CPU. The technology enables service providers to use resources more efficiently. Since virtual servers behave like independent physical machines, the virtual services can run more complicated applications such as databases, security and telnet on a shared server. However, while helping in providing fractional solutions, the virtual servers still behave like small independent servers with limited resources. Thus, to guarantee QoS, the service provider must allocate resources for handling the peak loads of its clients, which can be much larger than the average load on the system.

In a conventional system, a client desiring a good QoS must provide for some percentile of the peak load observed. The service provider on the other hand must therefore reserve resources for each client to service the client at peak load. This disadvantageously results in reservation of resources that lie mostly idle in a non-peak load condition.

Thus, a need clearly exists for a system of planning and allocating hosting-service resources in an optimal manner so as to overcome or at least ameliorate one or more of the disadvantages of conventional approaches to providing hosting services.

SUMMARY

In accordance with a first aspect of the invention, a method for allocating hosting-service resources to clients in at least one shared server is disclosed. The method includes the steps of:
discovering utilization patterns of the clients; and
allocating the resources to the clients dependent on the utilization patterns.

Preferably, the method further includes the step of providing bounds specifying minimum and maximum hosting-service resources for each of clients, allocating step also being dependent upon bounds.

Preferably, the method further includes the step of modeling dimensions for client use measures and utilization patterns. The method may further include the step of packing clients using stochastic vector packing. Further, the packing step may utilize at least one of the processes selected from the group consisting of a Roof Avoidance process, a Minimized Variance process, a Maximized Minima process, and a Largest Combination process.

Preferably, the hosting-service resources relate to at least one hosting service selected from the group consisting of collaborative hosting services, commerce hosting services, and e-business hosting services.

Preferably, the allocating step effects a Quality of Service (QoS) guarantee.

Preferably, the utilization patterns are dependent upon access rates of one or more websites, the access rates have periodicity on multiple time scales. Two or more clients may be selected from several clients on the basis of complementarity, wherein the hosting-service resources are allocated to the selected two or more clients as a combination. Further, the allocating step may include the step of selecting said two or more clients to be allocated to a server. The two or more selected clients may each have a peak load that is substantially disjoint in time in relation to a peak load of the remaining other selected clients. Further, the allocated host-service resources may include resources allocated exclusively to each of the selected two or more clients and shared resources allocated to the combination for use by the selected two or more clients. Still further, N clients may be selected and allocated to a server, with N being an integer greater than or equal to two. The server may be partitioned into N virtual servers, each client being exclusively allocated a corresponding one of the N virtual servers. Excess capacity of the server beyond the capacity required to provide the N virtual servers is shared by the N clients.

Preferably, the method further includes the step of monitoring the clients to discover the utilization patterns.

In accordance with a second aspect of the invention, an apparatus for allocating host-service resources to clients in at least one shared server is disclosed. The apparatus includes: a device for discovering utilization patterns of the clients; and a device for allocating the resources to the clients dependent on the utilization patterns.

In accordance with a third aspect of the invention, a computer program product having a computer readable medium having a computer program recorded therein for allocating host-service resources to clients in at least one shared server is disclosed. The computer program product includes: a computer program code module for discovering utilization patterns of the clients; and a computer program code module for allocating the resources to the clients dependent on the utilization patterns.

In accordance with a fourth aspect of the invention, a decision support system for allocating and planning resources in hosting computing services is disclosed. The decision support system includes:

a device for modeling utilization of resources of one or more servers by clients in response to at least one of utilization patterns of the clients and specified rules regarding quality of service; and a device for determining a minimum number of servers for accomodating the clients to ensure a specified minimum quality of service.

Preferably, the determining device utilizes stochastic vector packing. The system facilitates optimal management of resources in the hosting computing services.

Preferably, the hosting computing services include hosting computing resources, computing applications, computing-related services, and network bandwidth.

Preferably, the device for generating for a service provider a set of suggestions for optimal resource planning and allocation.

Preferably, the system provides an optimization service for use in a business model hosting optimization applications.

In accordance with a fifth aspect of the invention, a decision support method for allocating and planning resources in hosting computing services is disclosed. The method includes the steps of modeling utilization of resources of one or more servers by clients in response to at least one of utilization patterns of the clients and specified rules regarding quality of service; and determining a minimum number of servers for accomodating the clients to ensure a specified minimum quality of service.

In accordance with a sixth aspect of the invention, a computer program product having a computer readable medium having a computer program recorded therein for providing decision support to allocate and plan resources in hosting computing services. The computer program product includes: a computer program code module for modeling utilization of resources of one or more servers by clients in response to at least one of utilization patterns of the clients and specified rules regarding quality of service; and a computer program code module for determining a minimum number of servers for accomodating the clients to ensure a specified minimum quality of service.

BRIEF DESCRIPTION OF THE DRAWINGS

A small number of embodiments are described hereinafter with reference to the drawings, in which.

DETAILED DESCRIPTION

Figure 1:
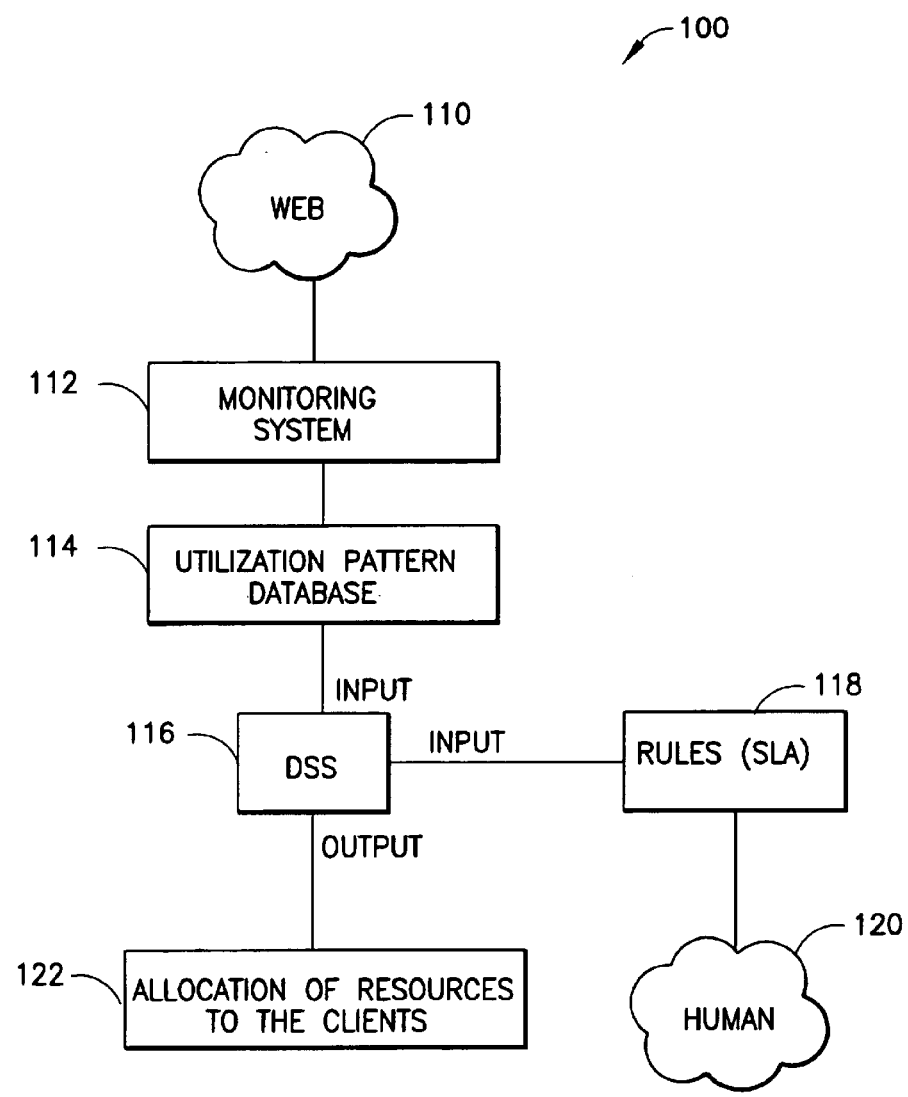
FIG. 1 is a block diagram of a system for optimally allocating and planning resources for hosting computing services in accordance with a preferred embodiment of the invention.

A method, an apparatus, and a computer program product are disclosed for optimally allocating and/or planning resources for hosting computing services (or simply hosting services). In the following description, numerous details are set forth including particular hosting services such as email, webhosting, and the like. It will be apparent to one skilled in the art, however, that the present invention may be practised without these specific details. In other instances, well-known features are not described in detail so as not to obscure the present invention.

In the following description, components of the hosting-service resource allocation and/or planning system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The preferred embodiment provides a system for optimally allocating and planning hosting service resources, and more particularly a decision support system, that assists a service provider in planning and allocating computing resources, computing applications and other computing services. In this embodiment, stochastic modeling and methods for resource allocation and planning, which meet customer needs and provide a Quality of Service (QoS) based on utilization patterns, are also disclosed. The embodiments of the invention provide a decision support system that assists service providers in providing hosting services in a manner that satisfies customer requirements and QoS.

Overview

The embodiments of the invention advantageously provide a decision support system for optimal resource planning in web farms that host computing services, based on the requirements of the clients. The resources are allocated to the clients based on suggestions given by the decision support system to ensure better QoS guarantees to the clients, while requiring fewer resources.

The resource utilization of various web-sites or web applications is assumed to be closely correlated to the access rates of the same. Access rates of web-sites are observed to have periodism on multiple time scales in nature. In the embodiments of the invention, these patterns are used to arrive at suitable combinations of clients, such that a set of clients in the same combination are co-hosted on a shared server. As far as possible, the combinations are chosen so that the clients in the same combination experience a peak load in disjoint time periods. For example, one client having a weather forecast application may be accessed mainly in the morning, while another client requires stock quotes that may be accessed in the evening. Also, for example, sites accessed from the United States and India are more heavily loaded at alternate times in the day, considering the difference in time zones.

For the purpose of choosing such client combinations, the concept of complementarity is defined, which is used to determine clients that have peak periods in almost disjoint intervals.

Unlike conventional systems, the embodiments of the invention provide a method in which the provider does not reserve resources exclusively for each client to service the client's peak load, but instead reserves resources for a combination of clients that can share the resources as per their time-dependent requirements.

The combinations of clients that are co-hosted on a shared server are chosen such that the clients in the same combination experience peak loads at different times. The service provider may also reserve a certain amount of resources exclusively for each client in a combination. Thus, a client has access to two types of resources, one that has been exclusively reserved for the client as well as the shared resource reserved for the combination of clients, of which the client is a part.

Providing resources for the clients in such combinations has a significant advantage. Each client can be guaranteed a minimum amount of resources and also guaranteed more than the minimum with a certain probability. Since some resources are reserved exclusively for each client, a peak load of a co-hosted client does not adversely affect other clients hosted on the same shared server on the average. This method provides better QoS for the same number of clients and resources. In addition, the method according to the embodiments requires fewer resources to provide the same QoS for the same number of clients with the same resource utilization rates.

Client Workload Characterization

The client resource requirement is modeled as a stationary stochastic process. Web access rates are typically distributed differently during the day. This fact is captured by dividing the day into k time slots (e.g., k=24 and each time slot is an hour long) and modeling the resource requirements of each client as a different stationary stochastic process in different time slots and for different resources. For r resources and k time slots, the resource requirement of each client is modeled as a random vector having d=r×k dimensions. Thus each dimension of the requirement vector represents a particular resource in a specific time interval.

The resource requirement process is assumed to have the same distribution each day. Although the model is described for a 24-hour period, another period that is better suited to the data may be chosen. Let the random variable $X\_\{ij\}$ denote the requirement of client i at any time t in the time interval corresponding to dimension j (due to the stationarity assumption, this random variable has a distribution that is independent of t).

As a performance guarantee each client i negotiates an agreement whereby the client is always allocated a minimum resource requirement $a\_\{ij\}$ (at least 0), and can specify a maximum requirement of $b\_\{ij\}$ (less than or equal to the capacity of a server) for all $j=1, \ldots, d$. Notice that the minimum and maximum requirements are allowed to vary over time and resources.

Let $Y\_\{ij\}$ denote the capacity promised to client i in dimension j. Then from a probability distribution viewpoint:

$$Y\_\{ij\} = a\_\{ij\} \text{ if } X\_\{ij\} < a\_\{ij\}$$
$$= X\_\{ij\} \text{ if } a\_\{ij\} <= X\_\{ij\} <= b\_\{ij\}$$
$$= b\_\{ij\} \text{ otherwise.}$$

The past access pattern of client i is used to estimate the distribution of $X\_\{ij\}$ and hence of $Y\_\{ij\}$ for $j=1,2,\ldots,d$.

Alpha-satisfiability is introduced as a measure of QoS. A client is said to be alpha-satisfied if the client receives a promised capacity at least alpha proportion of time in each dimension.

Let clients $C\_1, C\_2, \ldots, C\_n$ be allocated to a server and let $Q=(Q\_1, \ldots, Q\_d)$ denote the server capacity in dimensions $1, \ldots, d$. This allocation is alpha-satisfiable if for every $j=1, \ldots, d$, the probability, $$P(Y\_\{1j\}+Y\_\{2j\}+ \ldots +Y\_\{nj\}>=Q\_j)<=1-\text{alpha},$$

where alpha is a scalar constant close to 1. This is a much stronger guarantee than the one that ensures that during a period of 24 hours a client is given promised capacity alpha proportion of time. In that case client may not be given the desired capacity during his peak requirement period.

Resource Allocation Problem

Given N clients, the minimum number of servers needed to host the clients is sought, subject to alpha-satisfiability as defined above. Each client resides on one of the servers, sharing the server with the other clients on the server.

This problem can be solved through a vector-packing approach. Vector-packing is a generalization of bin-packing to multiple dimensions. Bin-packing is an integer programming problem where items of various sizes are to be packed into bins of a given capacity, so as to minimize the number of bins. Multidimensional bin-packing packs volumes into a multi-dimensional space. However, the generalization needed must ensure that the jobs (clients) do not overlap in any dimension.

Servers are not required to have equal capacity Q. However, the capacity needs to be normalized by scaling different resources as follows. Let $Q\hat{\;}i\_j$ be the capacity of the ith type of server in the jth dimension. Let $Q\hat{\;}max\_j$ be the the maximum value of $Q\hat{\;}i\_j$ over all i types of servers. Then, the units in which each resource is measured are scaled so that $Q\hat{\;}max\_j$ is the same for all dimensions $j=1, \ldots, d$.

A part of each server's resources is partitioned among the clients on the server, and the remaining resources are available as a common pool. Each server is modeled as a collection of resources, such as CPU, memory and bandwidth, with capacity constraints on each one. The ith client's partition has size corresponding to its minimum requirements $a\_\{ij\}, j=1, \ldots, d$. The effect of this partition is to give each client protection from load surges from other clients on the same server.

It is important to note here that, only those entities are considered resources, which are considered significant in resource planning. It is desirable to have fewer resources and time intervals, both to reduce computational complexity as well as to improve the resource utilization. Only a single abstract resource could model a system where there is a high correlation between the load on these resources, or if there is a single bottleneck resource. The choice of the set of resources is left to the provider.

System and Method of Preferred Embodiment

FIG. 1 is a block diagram of a system for optimally planning and/or allocating resources for hosting services in accordance with a preferred embodiment of the invention. The system 100 includes a monitoring system 112, a decision support system (DSS) 116, and a module for allocating resources to clients 122. The monitoring system 112 is coupled to the Internet or web 110 and monitors client accesses for resources. The monitoring system 112 consequently produces a utilization pattern database 114, which is provided as input to the decision support system 116. Further, human 120 input can be used to produce rules (SLA) 118, which are also provided as input to the decision support system 116. The decision support system 116 provides suggestions to a module 122 for allocating resources optimally to clients. The system 100 obtains utilization/access patterns from the utilization database 114 and preferably the contractual/service level agreement (SLA) from an SLA database (not shown). After obtaining the SLA rules/access data from relevant databases, the DSS 116 outputs suggestions for optimal resource planning and allocation to a human interface. A person may pick a suggestion from one of these outputs or look for an alternate set of suggestions by changing the SLA rules in the SLA database.

Figure 2:
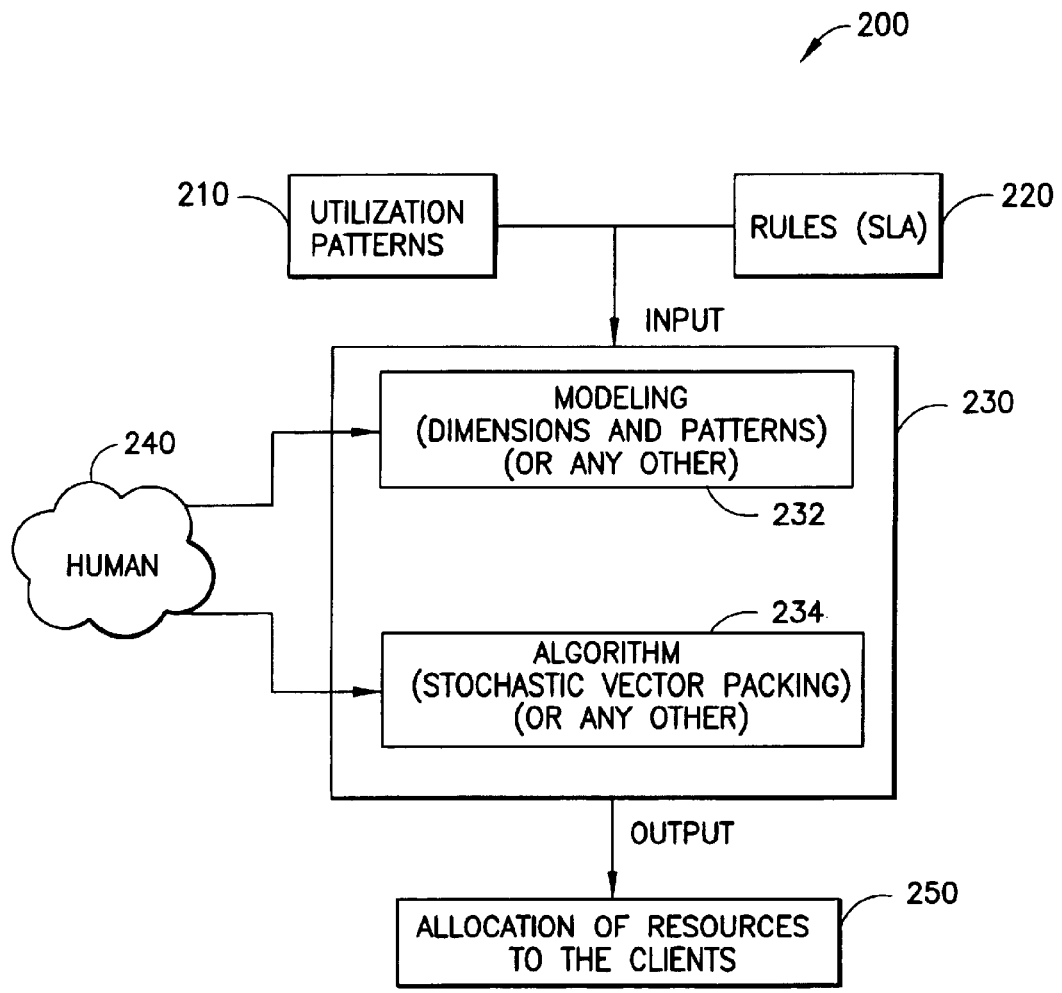
FIG. 2 is a detailed block diagram of a decision support system included in the system of FIG. 1.

FIG. 2 is a more detailed block diagram illustrating the decision support system. In the system 200 of FIG. 2, utilization patterns 210 and rules (SLA) 220 are provided as input to the decision support system 230. The decision support system 230 in turn includes a modeling module 232 and a stochastic vector-packing module 234. Human input 240 can be provided to both modules 232 and 234. The modeling module 232 receives the inputs 210 and 220 and is in turn coupled to the vector module 234. The vector-packing module 234 in turn provides suggestions as output to a module for allocating resources to clients 250. Again, a person can intervene in deciding the model and the method on which the system may work to arrive at the set of suggestions.

Figure 3:
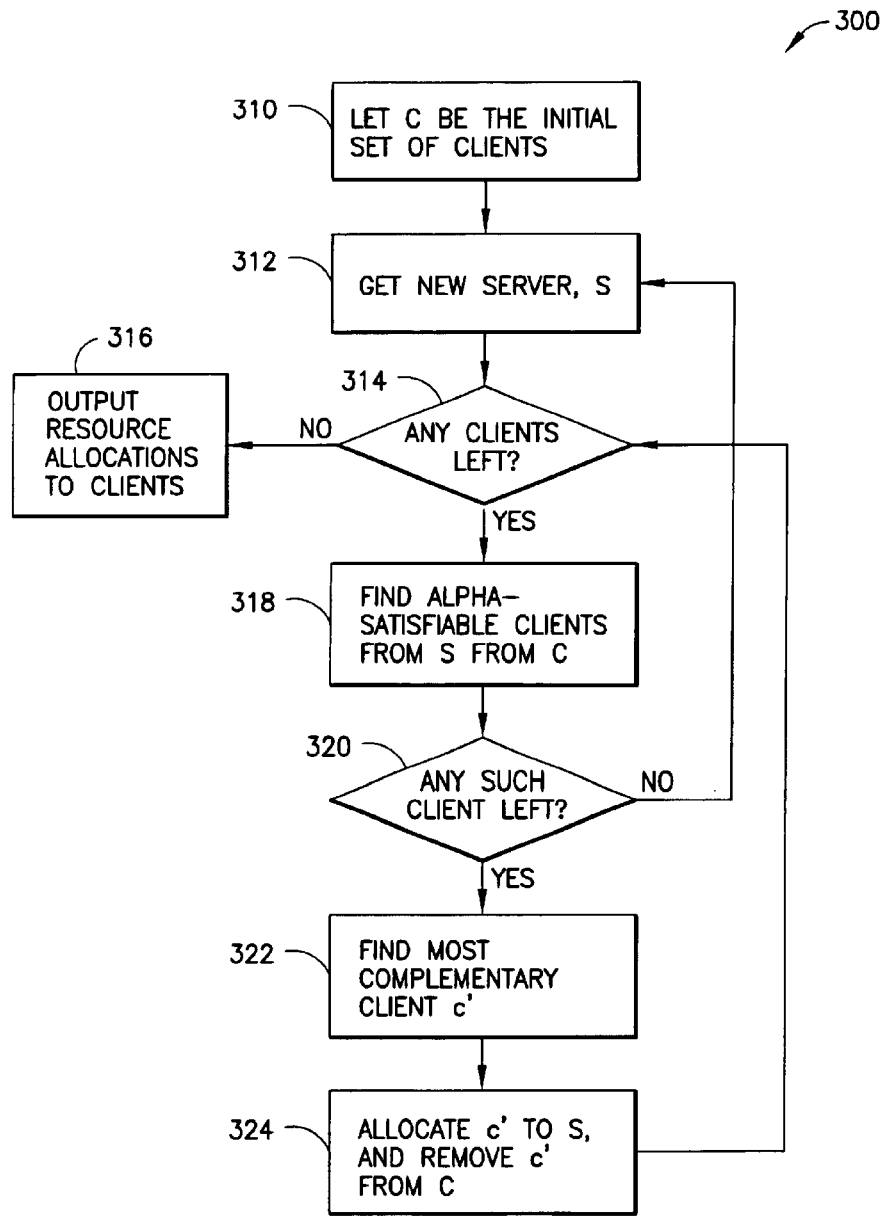
FIG. 3 is a flowchart of a method for optimally allocating and planning resources for hosting computing services in accordance with the preferred embodiment of the invention.

FIG. 3 is a flow diagram illustrating the method 300 of optimally planning and/or allocating hosting-services resources in accordance with the preferred embodiment of the invention. The process 300 commences in step 310. In step 310, an initial set of clients C is provided. In step 312, a new server S is obtained. In decision block 314, a check is made to determine if there are any clients left remaining to be processed. If decision block 314 returns false (No), processing continues in step 316 and resource allocations are output to the clients. Otherwise, if decision block 314 returns true (Yes), processing continues at step 318.

In decision block 318, alpha-satisfiable clients are found for the new server S from the set of clients C. In decision block 320, a check is made to determine if any such clients were found in step 318. If decision block 320 returns false (No), processing continues at step 312. Otherwise, if decision block 320 returns true (Yes), processing continues at step 322.

In step 322, the most complementary client c' is found. In step 324, the client c' is allocated to the new server S and removed from the set of clients C. Processing then continues at decision block 314.

Packing Heuristic

Clients $C\_1, \ldots, C\_N$ are to be packed into servers. During the progress of the process 300 clients $C\_n, \ldots, C\_N$ are left to be packed, $n<=N$, where N is the total number of clients. The ith client is represented by a resource usage vector $Y\_i=(Y\_\{i1\}, \ldots, Y\_\{id\})$, where each element is a random variable.

Servers are chosen to be packed in a sorted sequence. For example, the servers could be in decreasing order of mean capacity. If there is a set of dimensions of higher priority, the servers may be sorted in mean capacity over only these dimensions, e.g., one may want to prioritize the dimension that corresponds to a peak time period and an expensive resource.

At a given time, only one server is open for packing, clients being added to the server one-by-one. Let $Q=(Q\_\{1\}, \ldots, Q\_\{d\})$ be the capacity of this server. At the time a client is added, either the server is empty, or there are existing clients in the server. Let $C\_B$ be the set of clients already in the current server. Let $B=(B\_1, \ldots, B\_d)$ denote the distribution of the resource utilized in the current server due to the clients already in the server. Let $E(B)=(E(B\_1), \ldots, E(B\_d))$ be the vector of expected values of the resource utilized in the dimensions of the current server.

If the ith client is chosen as a suitable addition to the current server, the server's resource utilization vector is updated to the element-by-element convolution of $Y\_i$ with B. The new server distribution $B\_new=(B\_1*Y\_\{i1\}, \ldots, B\_d*Y\_\{id\})=B*Y_{13}$ i, where the * symbol represents the convolution operation. Let $C\_alpha$ denote the subset of clients $\{C\_n, \ldots, C\_N\}$ that are alpha-satisfiable with the current server.

The idea of complementarity is used to allocate a client to the current server. The following heuristics may be used for finding the most complementary client for the current server:

Roof Avoidance

Let $E(Y\_\{i1\}), \ldots, E(Y\_\{id\})$ denote expected values resource requirement of $Y\_\{i1\}, \ldots, Y\_\{id\}$, for the ith client.

Let D be the dimension where the current server has the highest mean requirement, i.e., $E(B\_D)$ is the maximum among $E(B\_1), \ldots, E(B\_d)$. The mth client is said to be the most complementary client if, $E(Y\_\{mD\})$ is the minimum among all those $E(Y\_\{iD\})$ such that the ith client $C\_i$ is in the set $C\_alpha$ (i.e., $C\_m$ is the client that has the smallest mean in the dimension D, and that is also alpha-satisfiable).

Minimized Variance

Let the empty space in the server be denoted by $e=(e\_1, \ldots, e\_d)$, where $e\_j$ is the maximum amount of resource that may be taken away from this dimension so that the current server stays alpha-satisfiable. Denote the empty space in the current server if the ith client was added to the server by $e^i=(e\_1^i, \ldots, e\_d^i)$. The variance the empty space variance of the ith client.

Now the mth client is the most complementary client if the mth client gives rise to the least empty space variance among all the clients in $C\_alpha$. This variation attempts to have equalize the utilization over all dimensions, thereby preventing saturation in any one dimension.

Maximized Minima

Processing begins by finding $C\_m$ as in the Minimized Variance heuristic. Let $C\_v$ be a set of clients (subset of $C\_alpha$) with empty space variance close to that of $C\_m$, i.e., if $C\_i$ is in $C\_v$, then the difference between the empty space variance of $C\_i$ and $C\_m$ is less than a scalar constant V.

Define the maximum free space $f\_i$ for the ith client in $C\_v$ as the maximum $e\_j^i$ over all dimensions j. The most complementary client is now updated to $C\_m$, such that $f\_m$ the minimum among all $f\_i$, for all clients in $C\_v$. The motivation here is to keep the variance low with also a low maximum empty space.

Largest Combination

The set of clients $C\_v$, which have a low empty space variance, is found as in Maximized Minima. The mean of $e^i$ is called the mean empty space. The most complementary client is $C\_m$ has the least mean empty space among all the clients in $C\_v$. The motivation here is to keep the variance low with also a high overall usage of the server.

With the above procedures of finding the most complementary client, the packing proceeds as set forth in Table 1:

TABLE 1

Let C be the set of clients, { $C\_1, \ldots, C\_N$ }
While (C not empty)
    Pick a new server B
    The set of clients $C\_B$ is empty
    Let $C\_alpha$ be the alpha-satisfiable client set for server B
    While ($C\_alpha$ not empty)
        $C\_m$ is found as the most-complementary-client from $C\_alpha$
        Update the server probability distribution vector B
        Add $C\_m$ to $C\_B$
        Remove $C\_m$ from C
        Update $C\_alpha$ from the new C for the new distribution
    End
    close B
End The process of Table 1 finds its inspiration from one dimensional bin-packing together with the use of variance amongst the dimensions. The one-dimension bin-packing problem has been well studied. In that context off-line algorithms such as First-Fit Decreasing (FFD) and Best-Fit Decreasing (BFD) have been found effective with a worst case approximation bound of 11/9. Our first approach is in the spirit of Best-Fit Decreasing. However the emphasis of the multi-dimensional processes defined above is to reduce variance and thus avoid over-utilization of any one single dimension. The one-dimensional approach that attempts to bucket items into size classes is termed as Modified First-Fit Decreasing and is reported to improve on FFD. Our Maximized Minima approach performs a bucketing also but the criterion of the bucketing is the variance.

Implementation Issues

For a new client, resource utilization history may not be available. Unrestricted resources are allowed to such a client, initially. This allows characterization of the client's probability distribution. After the initial period, the distributions are continually updated for re-optimization of the layout. A new client is added to the most complementary server that is alpha-satisfiable with the addition of the client. If no such server can be found, then a new server is opened and add the client to this new server.

To support a change in customers requirements, change in utilization patterns, or deletion of clients from the farm, the client is removed from the server and the resources allocated to that server are freed. Then the client with new specifications and frequency distribution tables is added to the most complementary server, afresh. After a number of such additions, deletions, and reallocations the server farm may no longer have a close to optimal resource plan. It is thus desirable to have periodic maintenance wherein the entire process of allocation is repeated afresh for all currently hosted clients.

By treating larger sets of servers as one server, or by splitting larger clients, the requirement that each client's requirements always be less than one single server can be overcome. If some clients need to be replicated across servers, the system treats each replica as an independent client.

The process does not restrict the system from having high availability and fault tolerance. For high availability, each client may be split into two clients with the constraint that each half should be located on a separate machine. For replication, the system treats each client's replica as an independent client. The process simply includes a check for such clients so that such clients are not packed on the same server. To account for transient heavy demands, a safe capacity margin may be allowed in each server.

The system supports priority classes of clients. Each priority class has an alpha-satisfiability associated with the class. Each server is packed for one such class. Once a higher priority group has been packed, the servers are rearranged in order of decreasing empty space, and the process runs for the next lower priority group over all the servers. Since each server has a single alpha that the server is packed for, some lower priority clients may get packed into higher priority servers. Thus, resources are conserved while exceeding the QoS promised to certain clients.

The embodiments of the invention are preferably implemented using a general-purpose computer. In particular, the processing or functionality of FIGS. 1–3 can be implemented as software, or a computer program, executing on the computer. The method or process steps for optimally planning and/or allocating hosting-service resources are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous apparatuses for optimally planning and/or allocating hosting-services.

Figure 4:
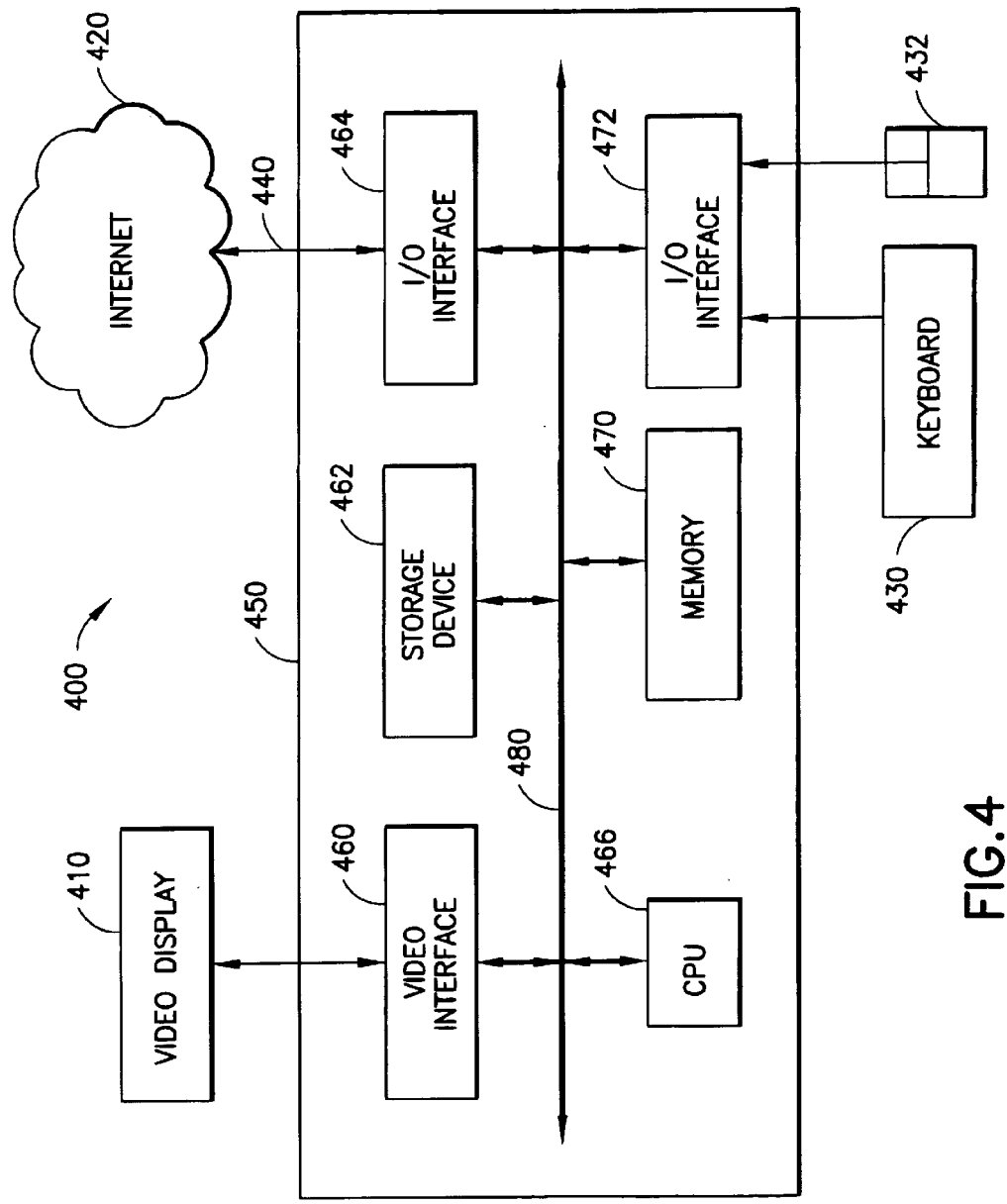
FIG. 4 is a block diagram of a general purpose computer, with which embodiments of the invention may be practiced.

Preferably, a computer system 400 shown in FIG. 4 includes the computer 450, a video display 410, and input devices 430, 432. In addition, the computer system 400 can have any of a number of other output devices including line printers, laser printers, plotters, and other reproduction devices connected to the computer 450. The computer system 400 can be connected to one or more other computers via a communication interface using an appropriate communication channel 440 such as a modem communications path, a computer network, or the like. The computer network 420 may include a local area network (LAN), a wide area network (WAN), an Intranet, and/or the Internet.

The computer 400 itself preferably includes a central processing unit(s) 466 (simply referred to as a processor hereinafter), a memory 470 which may include random access memory (RAM) and read-only memory (ROM), input/output (IO) interfaces 464, 472, a video interface 460, and one or more storage devices 462. The storage device(s) 462 can include one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus 480 that in turn can consist of data, address, and control buses.

The video interface 460 is connected to the video display 410 and provides video signals from the computer for display on the video display 410. User input to operate the computer can be provided by one or more input devices 430, 432. For example, an operator can use a keyboard 430 and/or a pointing device such as the mouse 432 to provide input to the computer.

The foregoing system is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet 420 and Intranets including email transmissions and information recorded on websites and the like. The foregoing are merely examples of relevant computer readable mediums. Other computer readable mediums may be practiced without departing from the scope and spirit of the invention.

In the foregoing manner, a method, an apparatus, and a computer program product for optimally planning and/or allocating hosting-service resources are disclosed. While only a small number of embodiments are described, it will be apparent to those skilled in the art in view of this disclosure that numerous changes and/or modifications can be made without departing from the scope and spirit of the invention.

We claim:

1. A method for allocating hosting-service resources to clients in at least one shared server, said method comprising:
   discovering utilization patterns of said clients;
   monitoring said clients to discover said utilization patterns;
   providing bounds specifying minimum and maximum hosting-service resources for each of said clients;
   modeling dimensions for client user measures and said utilization patterns; and
   allocating said resources to said clients dependent on said utilization patterns.

2. The method according to claim 1, said allocating being dependent upon said bounds.

3. The method according to claim 1, further including packing said clients using stochastic vectors.

4. The method according to claim 3, wherein said packing utilizes at least one of a Roof Avoidance process, a Minimized Variance process, a Maximized Minima process, and a Largest Combination process.

5. The method according to claim 1, wherein saidhosting-service resources relate to at least one hosting service comprising one of collaborative hosting services, commerce hosting services, and e-business hosting services.

6. The method according to claim 1, wherein said allocating affects a Quality of Service (QoS) guarantee.

7. The method according to claim 1, wherein said utilization patterns are dependent upon access rates of one or more websites, said access rates have periodicity on multiple time scales.

8. The method according to claim 7, wherein two or more clients are selected from a plurality of clients on the basis of complementarity, wherein said hosting-service resources are allocated to said selected two or more clients as a combination.

9. The method according to claim 8, wherein said allocating comprises selecting said two or more clients to be allocated to a server, said two or more selected clients each having a peak load that is substantially disjoint in time in relation to a peak load of the remaining other selected clients.

10. The method according to claim 8, wherein said allocated hosting-service resources include resources allocated exclusively to each of said selected two or more clients and shared resources allocated to said combination for use by said selected two or more clients.

11. The method according to claim 9, wherein N clients are selected and allocated to a server, N being an integer greater than or equal to two, said server being partitioned into N virtual servers, each client being exclusively allocated a corresponding one of said N virtual servers, excess capacity of said server beyond the capacity required to provide said N virtual servers is shared by said N clients.

12. An apparatus for allocating hosting-service resources to clients in at least one shared server, said apparatus including:

means for discovering utilization patterns of said clients;

means for monitoring said clients to discover said utilization patterns;

means for providing bounds specifying minimum and maximum hosting-service resources for each of said clients;

means for modeling dimensions for client user measures and said utilization patterns; and means for allocating said resources to said clients dependent on said utilization patterns.

13. The apparatus according to claim 12, said allocating means being dependent upon said bounds.

14. The apparatus according to claim 12, further including means for packing said clients using stochastic vectors.

15. The apparatus according to claim 14, wherein said packing means utilizes at least one of a Roof Avoidance process, a Minimized Variance process, a Maximized Minima process, and a Largest Combination process.

16. The apparatus according to claim 12, wherein said hosting-service resources relate to at least one hosting service comprising one of collaborative hosting services, commerce hosting services, and e-business hosting services.

17. The apparatus according to claim 12, wherein said allocating means affects a Quality of Service (QoS) guarantee.

18. The apparatus according to claim 12, wherein said utilization patterns are dependent upon access rates of one or more websites, said access rates have periodicity on multiple time scales.

19. The apparatus according to claim 18, wherein two or more clients are selected from a plurality of clients on the basis of complementarity, wherein said hosting-service resources are allocated to said selected two or more clients as a combination.

20. The apparatus according to claim 19, wherein said allocating means includes means for selecting said two or more clients to be allocated to a server, said two or more selected clients each having a peak load that is substantially disjoint in time in relation to a peak load of the remaining other selected clients.

21. The apparatus according to claim 20, wherein N clients are selected and allocated to a server, N being an integer greater than or equal to two, said server being partitioned into N virtual servers, each client being exclusively allocated a corresponding one of said N virtual servers, excess capacity of said server beyond the capacity required to provide said N virtual servers is shared by said N clients.

22. The apparatus according to claim 19, wherein said allocated hosting-service resources include resources allocated exclusively to each of said selected two or more clients and shared resources allocated to said combination for use by said selected two or more clients.

23. A computer program product having a computer readable medium having a computer program recorded therein for allocating hosting-service resources to clients in at least one shared server, said computer program product including:

computer program code means for discovering utilization patterns of said clients; and computer program code means for monitoring said clients to discover said utilization patterns;

computer program code means for providing bounds specifying minimum and maximum hosting-service resources for each of said clients;

computer program code means for modeling dimensions for client user measures and said utilization patterns; and computer program code means for allocating said resources to said clients dependent on said utilization patterns.

24. The computer program product according to claim 23, said computer program code means for allocating being dependent upon said bounds.

25. The computer program product according to claim 24, further including computer program code means for packing said clients using stochastic vectors.

26. The computer program product according to claim 25, wherein said computer program code means for packing utilizes at least one of a Roof Avoidance process, a Minimized Variance process, a Maximized Minima process, and a Largest Combination process.

27. The computer program product according to claim 23, wherein said hosting-service resources relate to at least one hosting service comprising one of collaborative hosting services, commerce hosting services, and e-business hosting services.

28. The computer program product according to claim 23, wherein said computer program code means for allocating affects a Quality of Service (QoS) guarantee.

29. The computer program product according to claim 23, wherein said utilization patterns are dependent upon access rates of one or more websites, said access rates have periodicity on multiple time scales.

30. The computer program product according to claim 29, wherein two or more clients are selected from a plurality of clients on the basis of complementarity, wherein said hosting-service resources are allocated to said selected two or more clients as a combination.

31. The computer program product according to claim 30, wherein said computer program code means for allocating includes computer program code means for selecting said two or more clients to be allocated to a server, said two or more selected clients each having a peak load that is substantially disjoint in time in relation to a peak load of the remaining other selected clients.

32. The computer program product according to claim 31, wherein N clients are selected and allocated to a server, N being an integer greater than or equal to two, said server being partitioned into N virtual servers, each client being exclusively allocated a corresponding one of said N virtual servers, excess capacity of said server beyond the capacity required to provide said N virtual servers is shared by said N clients.

33. The computer program product according to claim 30, wherein said allocated hosting-service resources include resources allocated exclusively to each of said selected two or more clients and shared resources allocated to said combination for use by said selected two ore more clients.

34. A decision support system for allocating and planning resources in hosting computing services, said decision support system including:

means for modeling utilization of resources of one or more servers by clients in response to at least one of utilization patterns of said clients and specified rules regarding quality of service;

means for monitoring said clients to discover said utilization patterns;

means for providing bounds specifying minimum and maximum hosting-service resources for each of said clients;

means for modeling dimensions for client user measures and said utilization patterns; and means for determining a minimum number of servers for accommodating said clients to ensure a specified minimum quality of service.

35. The decision support system according to claim 34, wherein said determining means utilized stochastic vector packing.

36. The decision support system according to claim 34, wherein said system facilitates optimal management of resources in said hosting computing services.

37. The decision support system according to claim 34, wherein said hosting computing services include hosting computing resources, computing applications, computing-related services and network bandwidth.

38. The decision support system according to claim 34, including means for generating for a service provider a set of suggestions for optimal resource planning and allocation.

39. The decision support system according to claim 34, wherein said system provides an optimization service for use in a business model hosting optimization applications.

40. A decision support method for allocating and planning resources in hosting computing services, said method comprising:

modeling utilization of resources of one or more servers by clients in response to at least one of utilization patterns of said clients and specified rules regarding quality of service;

monitoring said clients to discover said utilization patterns;

providing bounds specifying minimum and maximum hosting-service resources for each of said clients;

modeling dimensions for client user measures and utilization patterns; and determining a minimum number of servers for accommodating said clients to ensure a specified minimum quality of service.

41. The method according to claim 40, wherein said determining utilizes stochastic vector packing.

42. The method according to claim 40, wherein said method facilitates optimal management of resources in said hosting computing services.

43. The method according to claim 40, wherein said hosting computing services include hosting computing resources, computing applications, computing-related services, and network bandwidth.

44. The method according to claim 41, further including generating for a service provider a set of suggestions for optimal resource planning and allocation.

45. The method according to claim 41, wherein said method provides an optimization service for use in a business model hosting optimization applications.

46. A computer program product having a computer readable medium having a computer program recorded therein for providing decision support to allocate and plan resources in hosting computing services, said computer program product including:

computer program code means for modeling utilization of resources of one or more servers by client in response to at least one of utilization patterns of said clients and specified rules regarding quality of service;

computer program code means for monitoring said clients to discover said utilization patterns;

computer program code means for providing bounds specifying minimum and maximum hosting-service resources for each of said clients;

computer program code means for modeling dimensions for client user measures and said utilization patterns; and computer program code means for determining a minimum number of servers for accommodating said clients to ensure a specified minimum quality of service.

47. The computer program product according to claim 46, wherein said computer program code means for determining utilizes stochastic vector packing.

48. The computer program product according to claim 46, wherein said computer program product facilitates optimal management of resources in said hosting computing services.

49. The computer program product according to claim 46, wherein said hosting computing services include hosting computing resources, computing applications, computing-related services, and network bandwidth.

50. The computer program product according to claim 46, further including computer program code means for generating for a service provider a set of suggestions for optimal resource planning and allocation.

51. The computer program product according to claim 46, wherein said computer program product provides an optimization service for use in a business model hosting optimization applications.

* * * * *